2,854,472
Patented Sept. 30, 1958

2,854,472

4 - DIALKYLAMINO - 2 - HYDROXYBENZYL-2 - HYDROXYPHENYLBUTYRONITRILE, CORRESPONDING ETHERS, AND AMIDES

Kurt J. Rorig, Glenview, Ill., assignor to G. D. Searle & Co., Chicago, Ill., a corporation of Delaware No Drawing. Application December 24, 1956
Serial No. 630,043

4 Claims. (Cl. 260—465)

This invention relates to 4-dialkylamino-2-hydroxybenzyl-2-hydroyphenylbutyronitrile, corresponding ethers, and the amides derived therefrom. More particularly, this invention relates to compounds of the formula

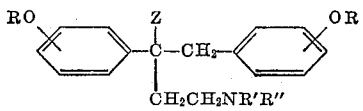

wherein Z is a cyano or amido radical, R is hydrogen or a lower alkyl radical, and R' and R" are lower alkyl radicals. Among the lower alkyl radicals contemplated are methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ radicals wherein $n$ is a positive integer amounting to less than 9.

It follows from the above that OR in the formula represents a hydroxy or lower alkoxy radical. As to the latter groupings, p-methoxy radicals are preferred. Of the lower alkyl radicals referred to by R' and R" in the formula, especially ethyl radicals are preferred.

Equivalent to the foregoing amines of this invention for the purposes here described are non-toxic acid addition and quaternary ammonium salts thereof, the composition of which may be symbolized by

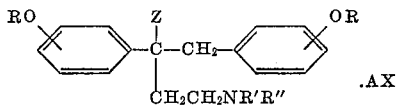

wherein Z, R, R', and R" have the meanings hereinbefore assigned; A is selected from among hydrogen and lower alkyl, hydroxy(lower alkyl), and lower alkenyl radicals, as also such aralkyl radicals as benzyl, phenethyl, and naphthylmethyl; and X is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. For example, they have a diuretic action; and further, they are characterized by a capacity to relax barium-induced spasm.

Manufacture of the claimed compounds proceeds as follows: 4-diethylamino-2-(p-methoxybenzyl)-2-(p-methoxyphenyl)butyronitrile results from the interaction of $\alpha,\beta$-dianisylpropionitrile and diethylaminoethyl chloride in the presence of alkaliamide, using an inert non-polar hydrocarbon solvent such as benzene, toluene, xylene, or the like as a reaction medium. The corresponding free phenol derives upon cleavage of the parent ether with hydrogen bromide preferably in acetic acid. Alternatively, the methoxynitrile may be hydrolyzed to an amide of this invention by treatment with sodium methoxide in aqueous alcohol.

As to acid addition salts of the foregoing amine bases, these are preparable by simple admixture of the base with one equivalent of any of various inorganic and strong organic acids, the anionic portion of which conforms to X as hereinabove defined.

The quaternary ammonium compounds comprehended by this invention are those derived by contacting a claimed base with an organic ester of the formula

AX

A and X having the same meanings previously assigned. Quaternization takes place in the temperature range between 25° and 100° centigrade, using an inert solvent such as chloroform, acetone, butanone, methanol, or butanol as a reaction medium. Quaternization is ordinarily completed in from 1 to 48 hours and is generally carried out in a closed system if a lower alkyl halide—such as methyl chloride—is one of the reagents.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

A. *4-diethylamino-2-(p-methoxybenzyl)-2-(p-methoxyphenyl)butyronitrile.*—A mixture of 80 parts of $\alpha,\beta$-dianisylpropionitrile, approximately 100 parts of diethylaminoethyl chloride, 20 parts of sodamide, and 675 parts of dry toluene is heated, with agitation, at the boiling point under reflux for 18 hours. The reaction mixture is then let stand for 2 days at room temperatures, following which it is decomposed by the addition of a combination of 235 parts of concentrated muriatic acid and 400 parts of water. Decomposition is facilitated by vigorous agitation during introduction of the aqueous acid. The mixture thus obtained stratifies in three layers on standing. The middle layer is separated and extracted with a mixture of ether and aqueous caustic soda. The ethereal solution which results from the extraction procedure is isolated and dried over anhydrous potassium carbonate. Evaporation of solvent leaves a residual oil which distills at 184–188° C. under 0.2 mm. pressure. The product thus obtained is 4-diethylamino-2-(p-methoxybenzyl)-2- (p-methoxyphenyl)butyronitrile, of the formula

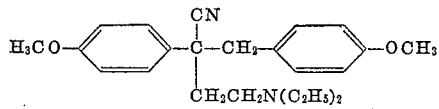

B. *4-diethylamino-2-(p-methoxybenzyl)-2 - (p - methoxyphenyl)butyronitrile methobromide.*—A mixture of 10 parts of 4-diethylamino-2-(p-methoxybenzyl)-2-(p-methoxyphenyl)butyronitrile, 17 parts of methyl bromide, and 55 parts of butanone is heated at 70° C. in a sealed kettle for 23 hours. Solvent is then evaporated and the residue thereupon taken up in approximately 100 parts of distilled water. The resultant aqueous solution is washed three times with thiophene-free benzene, following which it is treated with decolorizing charcoal, filtered, and finally lyophilized. The ivory fluffy powder thus obtained is too hygroscopic to afford a significant melting point. This material is 4-diethylamino-2-(p-methoxybenzyl)-2-(p-methoxyphenyl)butyronitrile methobromide.

*Example 2*

*4-diethylamino-2-(p-hydroxybenzyl)-2 - (p - hydroxyphenyl)butyronitrile.*—A mixture of 12 parts of 4-diethylamino-2-(p-methoxybenzyl)-2-(p - methoxyphenyl) - butyronitrile, 67 parts of glacial acetic acid, and 70 parts of 48% hydrogen bromide is heated at the boiling point under reflux for ¾ hour. The reaction mixture turns dark green within 5 minutes. Following the initial 45-minute heating period an additional 60 parts of 48% hydrogen bromide is introduced, whereupon boiling is resumed for 6 hours longer. The reaction mixture is then let stand at room temperature for 3 days. Approximately 600 parts of water is next added, following which neutralization is effected via the careful addition of solid sodium bicarbonate. The semi-solid oil thrown down is separated from the aqueous phase by decantation and taken up in approximately 65 parts of absolute ethanol. This solution is filtered hot, and to the filtrate is added approximately 90 parts of hot water. On cooling overnight, there are precipitated greenish-gray crystals of 4-diethylamino-2-(p-hydroxybenzyl)-2-(p - hydroxyphenyl)-butyronitrile, the melting point of which is 133–137° C. The product has the formula

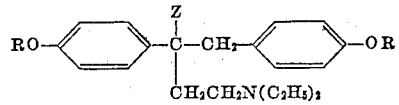

*Example 3*

*4-diethylamino-2-(p-methoxybenzyl)-2 - (p - methoxyphenyl)butyramide.*—A mixture of 15 parts of 4-diethylamino-2-(p-methoxybenzyl)-2-(p - methoxyphenyl) - butyronitrile, 45 parts of sodium methoxide, 75 parts of ethanol, and 3 parts of water is heated at the boiling point of the solvent present for 24 hours under reflux. The reaction mixture is then diluted with 125 parts of water, following which ethanol is removed by evaporation. The residue is extracted with a mixture of benzene and ether, and the resultant extract first washed with water and then dried over anhydrous calcium sulfate. Evaporation of solvent leaves an oily residue which crystallizes on standing. The crystals are washed with hexane and recrystallized from a mixture of benzene and hexane. The recrystallized product melts at 147–148° C. and has the formula

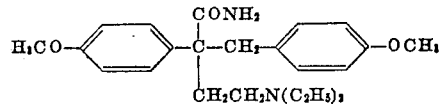

What is claimed is:
1. A compound of the formula

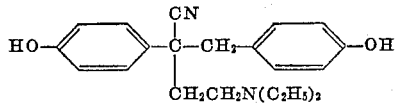

wherein Z is selected from the group consisting of cyano and amido radicals, and R is selected from the group consisting of hydrogen and the methyl radical.

2. 4-diethylamino-2-(p-methoxybenzyl)-2 - (p - methoxyphenyl)butyronitrile.

3. 4-diethylamino-2-(p-hydroxybenzyl)-2-(p- hydroxyphenyl)butyronitrile.

4. 4-diethylamino-2-(p-methoxybenzyl)-2 - (p - methoxyphenyl)butyramide.

References Cited in the file of this patent
UNITED STATES PATENTS

| | | |
|---|---|---|
| 2,570,286 | Surrey et al. | Oct. 9, 1951 |
| 2,768,195 | Dodson | Oct. 23, 1956 |

OTHER REFERENCES

Wheatley: Jour. Org. Chem., vol. 19, pp. 434–7 (1954).